Feb. 19, 1957
W. H. SPENCER
2,781,550
METHOD FOR MAKING ELASTIC BANDS
Filed July 18, 1952
3 Sheets-Sheet 1
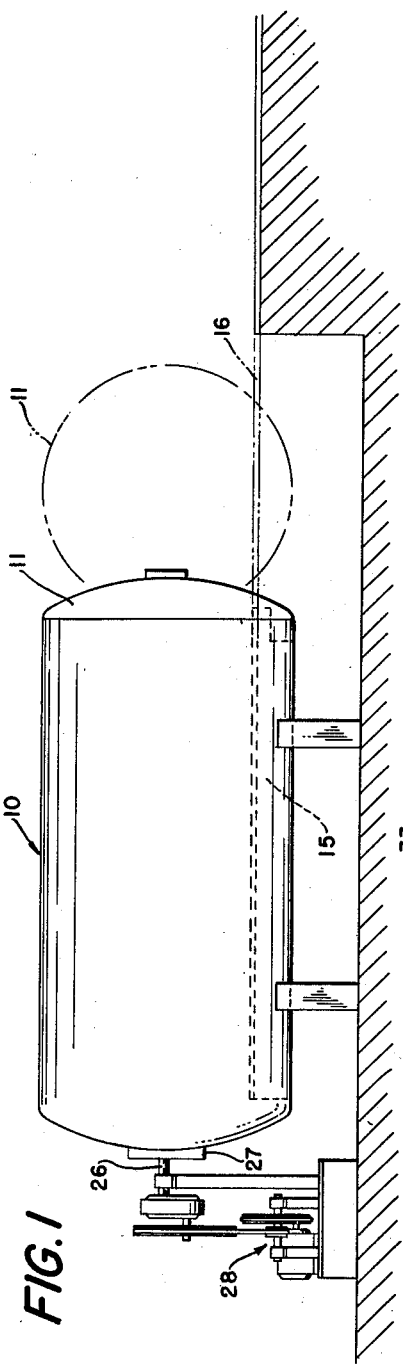
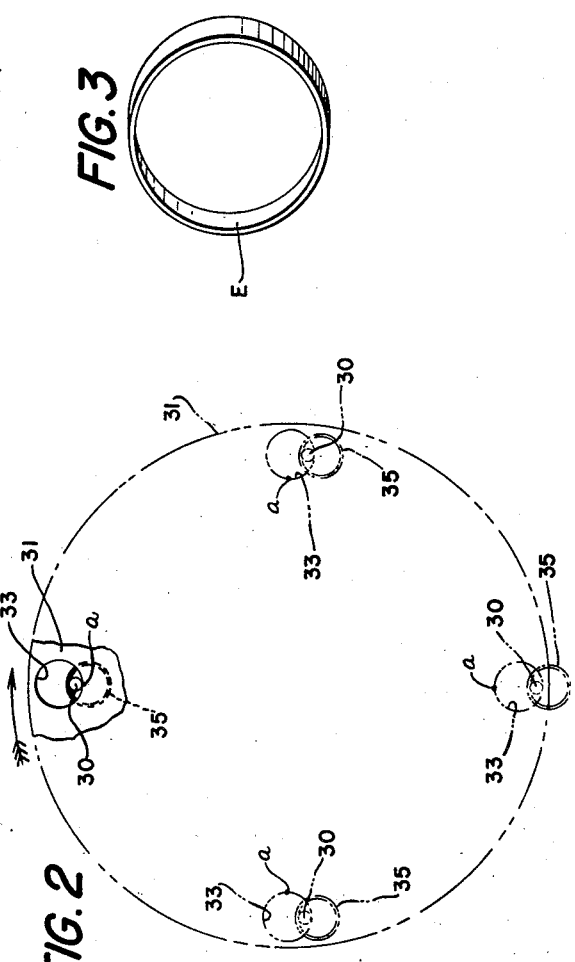
INVENTOR.
WILLIAM H. SPENCER
BY
William Cleland
ATTORNEY Feb. 19, 1957  W. H. SPENCER  2,781,550
METHOD FOR MAKING ELASTIC BANDS
Filed July 18, 1952  3 Sheets-Sheet 2
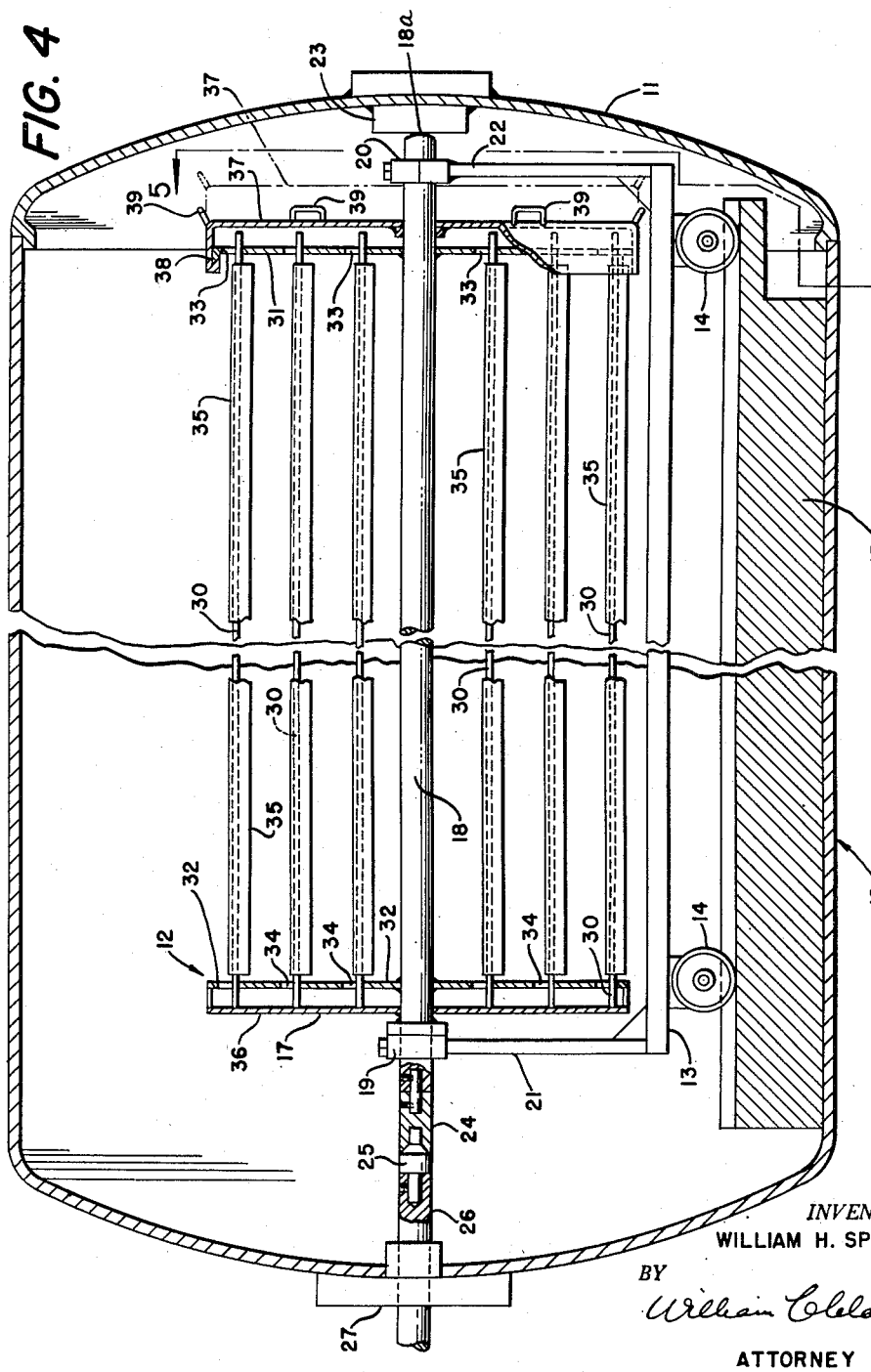
INVENTOR.
WILLIAM H. SPENCER
BY
*William Cleland*
ATTORNEY Feb. 19, 1957 W. H. SPENCER 2,781,550
METHOD FOR MAKING ELASTIC BANDS
Filed July 18, 1952 3 Sheets-Sheet 3

INVENTOR.
WILLIAM H. SPENCER
BY
William C. Cleland
ATTORNEY

United States Patent Office 2,781,550
Patented Feb. 19, 1957

2,781,550

METHOD FOR MAKING ELASTIC BANDS

William H. Spencer, Alliance, Ohio

Application July 18, 1952, Serial No. 299,549

5 Claims. (Cl. 18—53)

This invention relates to a method for manufacturing tubing of vulcanizable material, and particularly tubing for production of full-circle seamless elastic bands.

Heretofore, full-circle rubber bands have been produced by providing a tube of unvulcanized rubber by known extrusion methods, applying the extruded tube over a mandrel, placing the mandrel in open steam of a vulcanizer at about 190° F. for a vulcanizing cycle, removing the mandrel from the vulcanizer, removing the rubber tube from the mandrel, and cutting the tube into narrow bands of vulcanized rubber. This method, generally, has a serious disadvantage that it has been difficult to expand or mount the unvulcanized tubing onto the mandrel, and to remove the vulcanized tubing from the mandrel. Tubing mounted on a mandrel of relatively smaller diameter than the tubing has been objectionable because sagging of the tubing caused the elastic bands to be elongated or ovate instead of circular; moisture condensation on the inner surface of the tubing, from the vulcanizing steam ostensibly had a tendency to weaken the elastic bands; and over-curing at the points of contact of the tubing with the mandrel, usually metal, had a similar tendency to weaken the elastic bands at said points of contact.

One object of the present invention is to provide a method by which the unvulcanized, extruded tubing of rubber-like material is easily mounted on a mandrel of relatively smaller diameter, and wherein the tube is maintained truly circular during the vulcanization process.

Another object of the invention is to provide a method of the character described wherein localized metal to rubber contact and condensation of moisture are obviated, whereby the elastic bands produced will be of substantially uniform elasticity and strength throughout.

Other objects of the invention will be manifest from the following brief description and the accompanying drawings:

Of the accompanying drawings:

Figure 1 is a side elevation, partly in cross-section, illustrating an open steam type vulcanizer utilized in connection with the invention.

Figure 2 is a diagrammatic illustration of a portion of the apparatus used in practicing the method of the invention.

Figure 3 is a perspective view of a full-circle rubber band made by said method.

Figure 4 is an enlarged vertical cross-section taken longitudinally through the vulcanizer of Figure 1, and illustrating the improved vulcanizing apparatus.

Figure 5:
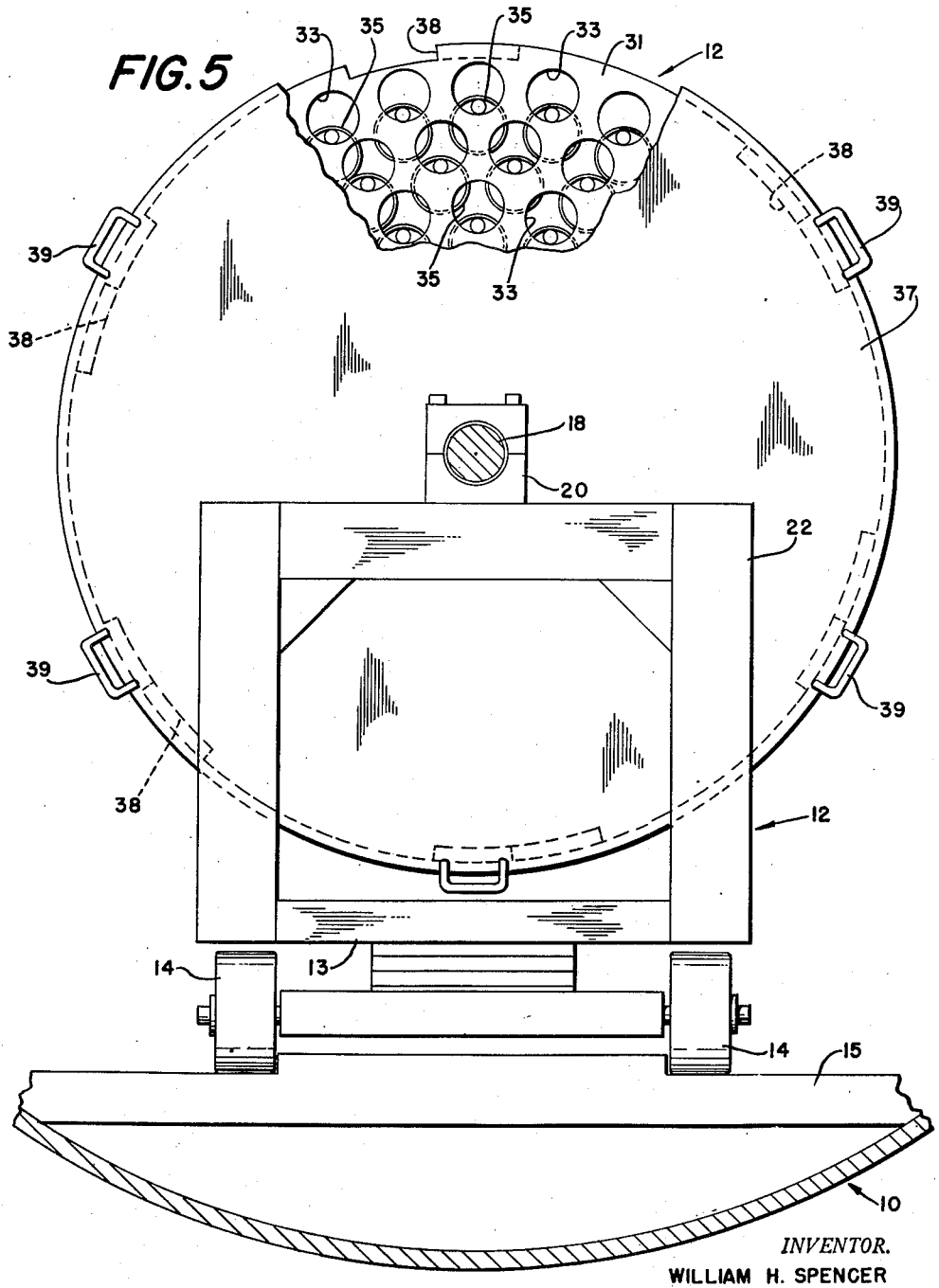
Figure 5 is a cross-section, on the same scale, taken substantially on the line 5—5 of Figure 4.

Referring to Figures 1, 4 and 5, there is illustrated an open steam type vulcanizer 10 having a door 11 at one end of the same for passage of a mobile tube vulcanizing unit or support 12, said unit including a truck 13 provided with wheels 14 adapted to run on fixed track means 15 within the vulcanizer and retractible track means 16 exteriorly thereof. On the truck 13 is a tube supporting reel 17 having a central shaft 18 journalled in bearings 19 and 20 at the upper ends of spaced uprights 21 and 22 on the truck, whereby the reel is rotatable about a horizontal axis. Shaft 18 has a rounded end portion 18a engageable with a stop block 23 on the inner face of door 11, when a clutch part 24 fixed on the other end of the shaft is in clutching engagement with a complemental clutch part 25 on the axially aligned end of a driven shaft 26 journalled in a bearing 27 in the corresponding end wall of the vulcanizer. Driven shaft 26 is rotated at desired speed by suitable power mechanism indicated generally at 28 in Figure 1.

The reel 17 is designed to support a plurality of cylindrical mandrels 30 in a manner to provide desired rotative movement to rubber tubing material received thereon as the reel is rotated. Accordingly, said reel may include axially spaced outer and inner disc-like end plates 31 and 32, respectively, each having therethrough a plurality of radially and circumferentially relatively closely spaced circular openings 33, 33 and 34, 34, of substantially larger diameter than the cross-section of the mandrels (see Figures 4 and 5), the lowermost edge portions of the respective aligned opening 33 and 34 being adapted to support protruding ends of the mandrels 30 having tubing 35 supported thereon in a manner to be described. The mandrels 30 may be retained against axial movement on the reel at the inner end thereof by a disc-like plate 36 fixed on the shaft 18 in inwardly spaced relation to end plate 32 and by a plate 37 mounted on the shaft 18 to be axially shiftable outwardly from and inwardly toward spaced relation thereof to the outer end plate 31. Plate 37 may be locked in this spaced relation, shown in Figure 4, as by means of a bayonet joint connection 38 between plate 37 and disc 31, the same being locked and unlocked by rotation of said plate by means of hand grips 39, 39 on the same. The arrangement is such that when the shiftable plate is moved outwardly of plate 31 (see chain-dotted lines at the right of Figure 4) the mandrels are axially movable endwise to the right to release the opposite ends thereof from engagement through the openings 34 of inner plate 32, whereby the mandrels are readily removable from the reel. Insertion or loading of the mandrels in the reel is accomplished in converse manner, the loading and unloading operations, of course, being accomplished while the unit 12 is outside the vulcanizer.

In operation of the apparatus described for practicing the improved method herein the unit 12, while located outside the vulcanizer 10 with the retaining plate 37 in the released position shown in chain-dotted lines in Figure 4, may have a series of mandrels 30 mounted in horizontal supporting position between the aligned openings 33 and 34 of end plates 31 and 32, respectively, these mandrels having supported thereon lengths of vulcanizable rubber or like tubing 35 from an extruding machine (not shown). As previously described the mandrels may be thus positioned on the reel by inserting the right hand ends of the same (see Figure 4) endwise through the openings 33 of outer plates 31 and then moving mandrels endwise to the left to insert the corresponding ends thereof through the openings 34 of the inner end plate 32, after which the retaining plate 37 is moved axially inwardly on shaft 18 and turned in proper direction to lock it in retaining position, through operation of the bayonet connections 38.

When the loaded mandrels 30 are all in position, the unit 12 is moved into the vulcanizer 10 until the clutch parts 24 and 25 are properly engaged, and the door 11 of the vulcanizer is closed, after which mechanism 28 is operated to rotate the reel 17, through driven shaft 26. The tubes 35 on the rotary reel are exposed to the usual vulcanizing heat of open steam, contained in the vulcanizer at about 190° F., for about 12 minutes, after which the mechanism 28 is stopped and the unit 12 is removed from vulcanizer 10 for removal of the mandrels 30 from the reel 17 as previously described.

The method of the invention will be best understood by reference to Figure 2, wherein a fixed point "a" is indicated on the inner periphery of the large opening 33 (or 34) of plate 31 (or 32). When the reel makes a full revolution the point "a" will also make a full revolution, as indicated by chain-dotted positions of the opening 33. With each said revolution of point "a" the mandrel 30 will make a number of revolutions in clockwise direction, whereby the tube 35 supported on the mandrel is frictionally driven by the mandrel to rotate in clockwise direction. In the proportions shown in Figure 2 the rubber tube 35 would make at least one revolution with each revolution of the reel 17, so that if the reel makes twelve revolutions during a vulcanizing cycle, for example, the tube may also revolve about twelve times during the same period. The amount or speed of rotation of the tube 35 during the vulcanizing cycle may be varied to suit various conditions, such as the diameter of the tubing or the thickness thereof, or the grade of rubber. The diameter of the mandrel may also be varied to suit conditions, but in any event the diameter of the mandrel should be smaller than that of the tubing 35 so that the latter will be freely suspended from a contacting area along the upper portion of the mandrel, as shown.

Rotation of the tube 35 during vulcanization thereof prevents scorching of the rubber along the area of contact of the tube with the hot metal of mandrel 30. Moreover, such rotation prevents accumulation of condensate at the bottom of the tube which would adversely affect uniform vulcanization of the rubber. The particles of the rubber are uniformly aligned and the total result is a tube of uniformly circular cross-section. Narrow elastic bands E, cut from this tube, in known manner, similarly will be of uniformly circular cross-section and of substantially uniform elasticity and tensile strength. A finished elastic band E is shown in Figure 3.

Generally speaking the method herein contemplates rotation of an elongated tube of vulcanizable elastic material while supporting the same by a portion of its peripheral wall along its entire length, and at the same time exposing the tube to open heat of vulcanization. Satisfactory speeds for this purpose have been found to be between one half and five revolutions per minute. In the reel 17 shown in the drawings the aligned openings 33 and 34 thereof may be, for example, approximately 2¼ inches, while the mandrels used therewith may be within a range 1¼ to 2 inches in diameter, depending upon the size of elastic bands to be made from the tubing. Rotation of the reel, and hence the mandrels, may be in alternately reversed directions to obviate any tendency toward twisting of the tubing.

Modifications of the invention may be resorted to without departing from the spirit thereof or the scope of the appended claims.

What is claimed is:

1. A method of making elastic tubing as for production of elastic bands, comprising the steps of providing a length of thin-walled tubing, of heat-curable, flexible elastic material, mounting said tubing on a horizontally extending supporting mandrel to suspend freely therefrom along an area of contact between the upper peripheral surface of the mandrel and the inner periphery of the tubing, and in the presence of open curing heat rotating the mandrel about its axis and thereby imparting rotative movement to the tubing on the mandrel, said rotative movement of the tubing being for at least a part of the time in which the elastic material becomes set during the curing cycle, whereby the particles of the elastic material are substantially uniformly aligned in the tubing, and whereby the cured tubing will have uniform tubular shape and uniform elasticity and tensile strength.

2. A method of making elastic tubing as for production of elastic bands, comprising the steps of providing a length of thin-walled tubing, of heat-curable, flexible elastic material, mounting said tubing on a horizontally extending supporting mandrel to suspend freely therefrom along an area of contact between the upper peripheral surface of the mandrel and the inner periphery of the tubing, and in the presence of open curing heat moving the horizontally extending mandrel in an orbit while rotating the mandrel about its axis and thereby imparting rotative movement to the tubing on the mandrel while moving in said orbit, said rotative movement of the tubing being for at least a part of the time in which the elastic material becomes set during the curing cycle, whereby the particles of the elastic material are substantially uniformly aligned in the tubing, and whereby the cured tubing will have uniform tubular shape and uniform elasticity and tensile strength.

3. A method of making elastic tubing as for production of elastic bands, comprising the steps of providing a length of thin-walled cylindrical tubing of vulcanizable, flexible, rubber-like material, mounting said tubing on a horizontally extending supporting mandrel to suspend freely therefrom along an area of contact between the upper peripheral surface of the mandrel and the inner periphery of the tubing, and in the presence of open heat of vulcanization moving the horizontally extending mandrel about a continuous orbit while simultaneously rotating the mandrel about its axis and thereby imparting rotative movement to the tubing on the mandrel, said rotative movement of the tubing being for at least a part of the time in which the elastic material becomes set during the vulcanizing cycle, whereby the particles of the elastic material are substantially uniformly aligned in the tubing, and whereby said vulcanized tubing will have uniform cylindrical shape and uniform elasticity and tensile strength.

4. A method of as set forth in claim 1, wherein rotation of the mandrel is periodically reversed to reverse the rotative movement of the tubing.

5. A method as set forth in claim 3, wherein movement of the mandrel is periodically reversed to reverse the rotative movement of the tubing.

References Cited in the file of this patent

UNITED STATES PATENTS

| 1,189,936 | Goldsmith | July 4, 1916 |
| 1,543,890 | Williams | June 30, 1925 |
| 1,623,183 | Hennessy | Apr. 5, 1927 |
| 1,665,309 | Laursen | Apr. 10, 1928 |
| 2,271,855 | Cleveland et al. | Feb. 3, 1942 |
| 2,557,439 | Kmentt | June 19, 1951 |